United States Patent [19]

Pfaff et al.

[11] Patent Number: 4,488,215
[45] Date of Patent: Dec. 11, 1984

[54] METHOD AND APPARATUS FOR CONTROLLING THE LOAD CURRENT OF A PULSED FREQUENCY CONVERTER

[75] Inventors: Gerhard Pfaff, Erlangen; Albert Wick, Hagenau, both of Fed. Rep. of Germany

[73] Assignee: Siemens Aktiengesellschaft, Munich, Fed. Rep. of Germany

[21] Appl. No.: 399,250

[22] Filed: Jul. 19, 1982

[30] Foreign Application Priority Data

Aug. 7, 1981 [DE] Fed. Rep. of Germany ....... 3131361

[51] Int. Cl.$^3$ ............................................. H02M 5/25
[52] U.S. Cl. ..................................... 363/159; 363/96; 363/165
[58] Field of Search ....................... 363/56, 57, 58, 96, 363/137, 157, 159, 160, 164, 165

[56] References Cited

U.S. PATENT DOCUMENTS 3,832,620 8/1974 Pollard ................................. 363/137

Primary Examiner—William M. Shoop
Assistant Examiner—Anita M. Ault
Attorney, Agent, or Firm—Kenyon & Kenyon

[57] ABSTRACT

A system for forming address signals which address respective converter switches in a frequency converter. The frequency converter is of the type wherein a DC voltage is provided for supplying electrical energy to phase outputs thereof in response to the states of the converter switches. In accordance with the invention, the phase output voltages, phase output currents, and predetermined desired phase currents are treated as space vectors from which are generated control difference space vectors. In one embodiment, a trigger pulse is generated externally and may be suppressed when the control difference vector has a value which is below a preselected tolerance limit. In a further embodiment, the trigger pulse is generated internally and is suppressed if the tolerance limit is exceeded. Upon the occurrence of each trigger pulse, a voltage space vector is addressed having a direction which is opposite to the control difference space vector. Such an oppositely directed space vector produces a fast reduction of the control difference. In a preferred embodiment, the discrete voltage space vectors are selected in accordance with the sign of the control difference. Thus, the particular space vector which is closest to the vectorial difference between the desired and actual load current vectors is selected. In further embodiments, the addressing signals may be formed so as to cause the phase outputs of the frequency converter to short circuit at a selectable one of the DC input terminals thereof.

13 Claims, 5 Drawing Figures

FIG 1

METHOD AND APPARATUS FOR CONTROLLING THE LOAD CURRENT OF A PULSED FREQUENCY CONVERTER

BACKGROUND OF THE INVENTION

This invention relates generally to systems for driving frequency converters, and more particularly, to a system wherein the frequency converter is provided with a predetermined signal which corresponds to a desired current at a load which is connected to the outputs of the frequency converter.

It is customary in the theoretical analysis of frequency converters and their connected loads to correlate the respective phase currents and voltages with two-dimensional current or voltage load vectors. In situations where a frequency converter is energized by means of predetermined DC input voltage wherein the switches of the converter selectably connect the respective phase outputs of the converter to the respective polarities of the DC input voltage supply such that the DC input supply is connected to the output of the converter selectably at its positive or negative terminals, each such phase output of the converter can assume only one of two discrete voltages which are defined by the magnitude of the DC input voltage and the state of the drive signal. In the operation of such an arrangement, a finite number of combinations are possible for driving the converter switches. In a three-phase converter, only $2^3 = 8$ switch combination states are possible, thereby allowing only a finite number of possible states of the resulting two-dimensional voltage vector. The two switch combination states where the phase outputs of the converter are all connected to either the positive or negative DC voltage input such that all of the phase outputs are in the same state provide the zero voltage point of the resulting two-dimensional voltage vector. The remaining switch combinations correspond to discrete two-dimensional voltage vectors.

In a three-phase arrangement, a total of 6 discrete vectors, Z1 to Z6, and 2 zero state (same state condition) vectors, $Z_+$ and $Z_-$, are therefore possible for the two-dimensional voltage vector. Intermediately positioned vectors can be provided in this arrangement by alternatingly addressing adjacent ones of the two-dimensional voltage vectors, thereby producing a pulsed output voltage. The mean value of the pulsed output voltage corresponds to the voltage value of the corresponding phase output. Thus, during pulsed operation of the converter, the load voltage is controlled, while the load current is free to assume a value which corresponds to the nature of the load.

It is often desirable in the operation of a load, illustratively a rotating-field machine, to regulate the load current to predetermined values. One known arrangement for achieving a regulated load current utilizes hysteresis controllers for determining a control difference between the actual current flowing through a load and a desired load current value. In such an arrangement, the control difference is determined for each phase current and the two-dimensional voltage vector of the load ("voltage vector") is controlled as a function of the control differences. In this manner, switching is performed from one discrete vector to another. In the known hysteresis controlled arrangement, the state of the output signal always changes if the control difference is outside of a range which is established by positive and negative tolerance limits. With each such state change, the polarity of the voltage is reversed at the respective phase output such that a further one of the discrete vectors which is possible for the voltage vector is addressed. Since the hysteresis controllers operate independently of one another for each phase output, the particular voltage vector which is addressed in each case is generally not predeterminable. Also, randomly occurring same state conditions are possible wherein all of the phase outputs are in the same state. It is a further problem with this known arrangement that a phase current can deviate from the preset value by as much as twice the value of the tolerance width, notwithstanding that switch-overs occur if a tolerance limit is exceeded.

It is, therefore, an object of this invention to provide an improved method for forming control signals for a pulsed converter wherein load current is controlled.

SUMMARY OF THE INVENTION

The foregoing and other objects are achieved by this invention which provides a method for controlling a frequency converter wherein the difference between an actual load current and a predetermined desired load current is determined and a trigger pulse is generated for switching the voltage vector from one discrete vector to another, in response to the difference between the actual and predetermined desired load current. For each trigger pulse, the control signals, which may be in the form of control pulses, are predetermined so that the voltage vector is opposed to a control difference vector which is derived from the difference between the actual and predetermined desired load currents. The control difference vector represents the vectorial difference between the two-dimensional current vector of the load ("current vector") and the desired two-dimensional current vector which corresponds to the predetermined values of the phase currents.

This invention is premised upon the concept that the selection of the discrete vector which is to be addressed in each situation should not be left to chance. Instead, the deviations of the actual current value from the desired current value in the customary manner of forming the current vector (i.e., the space vector of the load current) are the components of a space vector. Thus, the deviations between the actual and desired values of the phase currents which are present for a trigger pulse can be combined directly into the noted control difference vector. It should further be noted, however, that the timing (i.e., spacing of the trigger pulses used) and other operating parameters which describe the operating state can be taken into consideration. More specifically, a space vector can be generated as the control difference vector which, while being representative of the vectorial difference between the current vector and the desired current space vector, deviates somewhat from the vectorial difference.

The combination of drive signals which is generated for addressing the converter is selected so as to decrease the control differences as quickly as possible. Such is the case if the voltage vector to be addressed is practically opposed to the control difference vector. At each suitably selected trigger pulse, the voltage vector to be addressed can be calculated in advance and the inverter switch can be controlled accordingly until the occurrence of the next trigger pulse.

In the implementation of the method, an apparatus is provided which contains a first comparator stage, a trigger pulse generator, and a selection stage. The first comparator stage forms the instantaneous control differences by comparing the instantaneous actual values of the phase currents with predetermined desired values. The selection stage forms, for each trigger pulse, the drive signals for the voltage vector which is to be addressed until the next trigger pulse from the instantaneous control differences. As noted, the voltage vector to be addressed has a direction which is largely opposed to the control difference vector formed from the control differences.

BRIEF DESCRIPTION OF THE DRAWINGS

Comprehension of the invention is facilitated by reading the following detailed description in conjunction with the annexed drawings, in which.

DETAILED DESCRIPTION

Figure 1:
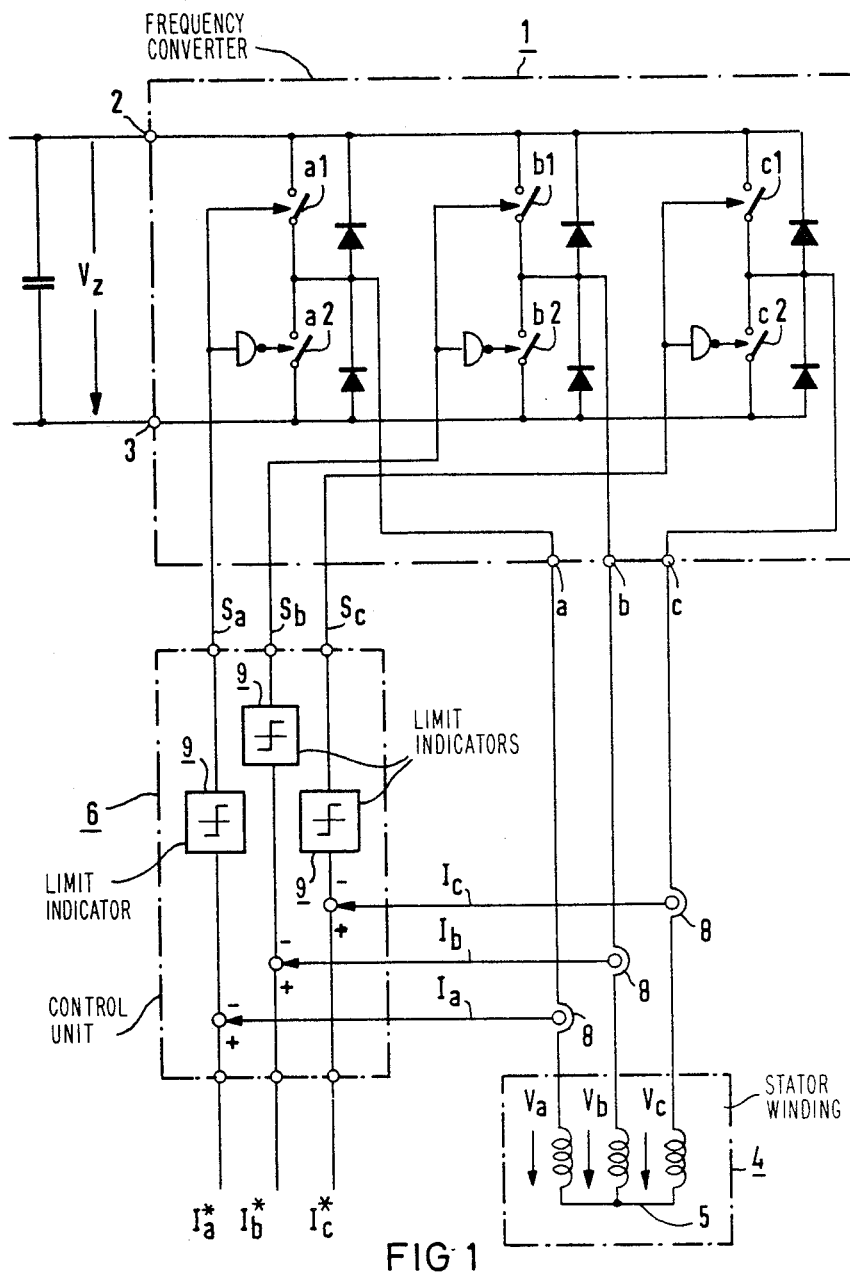
FIG. 1 is a block and schematic representation of a frequency converter connected to a load.

In accordance with the invention, a method is provided which is particularly suited for controlling a rotating field machine, or other symmetrical load, having a floating neutral terminal. FIG. 1 shows a frequency converter 1 which is supplied at input terminals 2 and 3 with a DC voltage $V_Z$. The frequency converter is connected at respective outputs a, b, and c to a stator winding 4 of a rotating field machine. As shown, stator winding 4 is provided with a neutral terminal 5 which also serves as the reference neutral node for phase voltages $V_a$, $V_b$, and $V_c$. Neutral node 5 is not connected to a reference potential. A control unit 6 controls the voltage at output terminal a by generating a drive signal $S_a$ which controls the operation of switches a1 and a2 in frequency converter 1. Switches a1 and a2 are alternatingly closed, in response to drive signal $S_a$, to input terminals 2 and 3, respectively. When drive signal $S_a$ has a value which corresponds to a logical 1 ($S_a=1$), switch a1 is closed and switch a2 is open. When the drive signal assumes a value which corresponds to a logical 0 ($S_a=0$), switch a1 is open and switch a2 is closed. In practical embodiments of the invention, thyristor or transistor switches may be used as switches a1 and a2. In order to preserve the clarity of the drawing, output amplifiers and other circuit elements which are generally used for actuating solid state switches are omitted in this schematic presentation. A drive signal $S_b$ drives a pair of switches b1 and b2 in the frequency converter to control the voltage at output terminal b. Similarly, drive signal $S_c$ controls switches c1 and c2 which produce a signal at output c. Switches b1, b2, c1, and c2 operate in the manner described with respect to switches a1 and a2.

Control unit 6 is provided with signals $I_a^*$, $I_b^*$, and $I_c^*$ which correspond to desired current magnitudes at the load. The control unit further receives signals $I_a$, $I_b$, and $I_c$ which are derived from transformers 8 and correspond to the actual load current values. Once again, in order to preserve the clarity of the drawing, control unit 6 is shown in simplified form to be provided only with limit indicators 9 in a first comparator stage.

Figure 2:
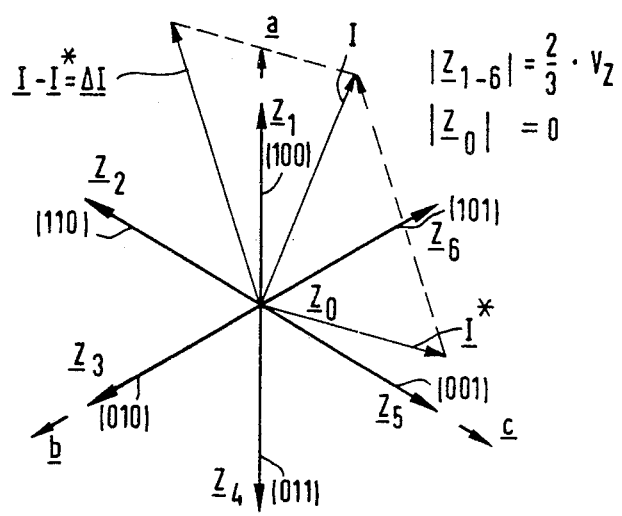
FIGS. 2 and 3 are vector diagrams showing possible discrete states of the load voltage in the form of two-dimensional vectors.

If a definite direction is assigned to each phase output, the phase voltages $V_a$, $V_b$, and $V_c$ can be considered as being components of a space vector of the load voltage with respect to the assigned directions, and combined to form the voltage vector. FIG. 2 shows a specific illustrative example of a space vector field for a symmetrical three-phase load. Three directions a, b, and c are each associated with respective outputs a, b, and c of frequency converter 1, and are displaced with respect to each other by 120°. If the converter switches are addressed by the addressing signal combination $S_a=S_b=S_c=1$, the state $V_a=V_b=V_c=0$ is addressed ("positive same state condition"), to which corresponds the zero state $V_a=V_b=V_c=0$ of the resultant voltage vector, designated as $Z_0$. The same zero state, $Z_0$, is achieved by the addressing signal combination corresponding to $S_a=S_b=S_c=0$. A vector $Z_1$ of the load voltage is addressed by the switch combination $S_a=1$, $S_b=S_c=0$, corresponding to the digital addressing signal (100). In this particular switch combination, switches a1, b2, and c2 are closed, and the other switches are open. In addition, FIG. 2 shows the further possible switch combinations, which combinations are indicated by their digital addressing signals as well as the discrete vectors $Z_2$ to $Z_6$. Accordingly, the direction of each of these vectors is determined by the corresponding addressing signal. The absolute value of the discrete vectors is $|Z_1|=|Z_2|=\ldots=|Z_6|=\tfrac{2}{3}V_z$.

In the known control system described hereinabove, the control device 6 consists essentially of a comparator for each phase output. The comparator is provided with a response limit which corresponds to a preset tolerance width, and the output signal of the comparator is conducted to the control device as the control signal for the switches operating on the corresponding phase output. Thus, for example, if at an instant when switches a1, b2, and c1 are closed by the output signal $S_s=(101)$, the current at the phase output a exceeds the preset desired value $I_a^*$ by the predetermined tolerance width. This may result because the preset current value is suddenly changed for a dynamic change of the load state, illustratively generator/motor operation of a rotating-field machine. The controller which is assigned to output a responds, and a change from switch a1 to switch a2 occurs. Thus, the polarity of the voltage at output a is reversed and the voltage now is opposed to the excess phase current $I_a$ beyond the tolerance limit. In the known arrangement, the other phase currents are monitored independently such that a further exceeding of the tolerance in the positive sense of the phase current $I_c$, or the exceeding of the tolerance in the negative sense of the phase current $I_b$, produces an addressing signal (000), i.e., negative same state condition, or an addressing signal (011). As a result of the hysteresis characteristic of the controllers, the exceeding of the tolerance in the positive sense of current $I_b$, or in the negative sense of the current $I_c$, does not produce a change in the addressed state (001). Thus, under some circumstances the phase currents exceed the predetermined tolerance limit by as much as twice the tolerance width.

In accordance with the invention, an actual current vector I, and a desired current vector I*, are each associated with the actual and desired values of the phase currents, as discussed above with respect to FIG. 2. A control difference vector $\Delta I$ is assigned to the controlled deviation $I-I^*$.

Figure 3:
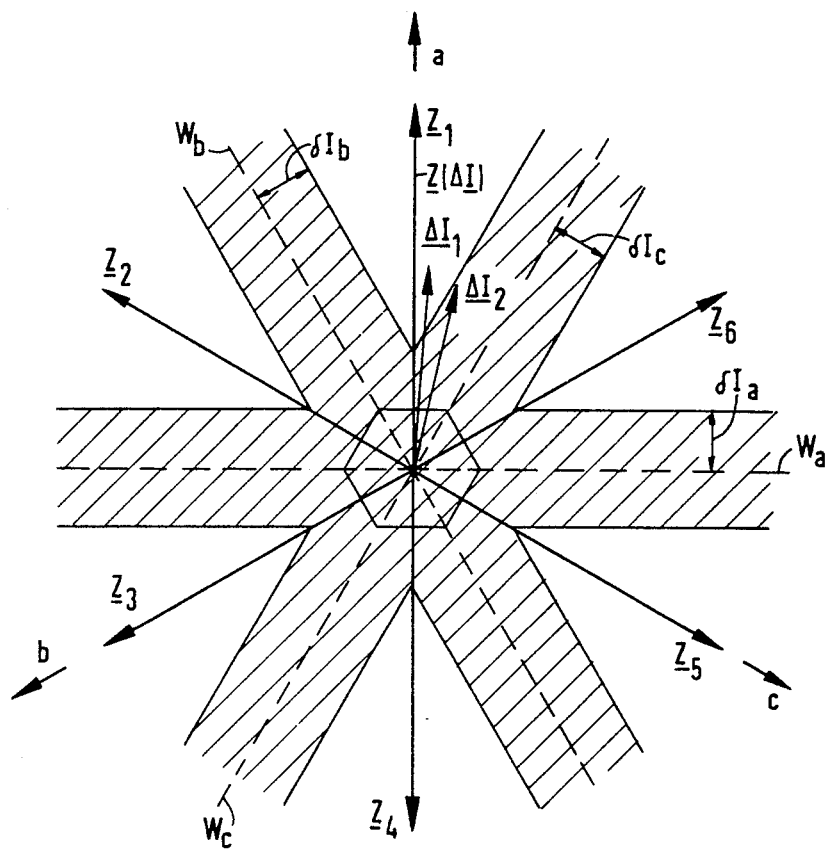

FIG. 3 shows a representation in which the control difference which is represented by the vector difference of the actual current vector and the desired current vector is shown in the voltage system by the discrete vectors $Z_1$ to $Z_6$, according to the possible states of the voltage vector. The area above the dashed line $W_a$ corresponds to a positive control deviation. The tolerance width is therefore represented by $W_a \pm \delta I_a$, and is shown by a shaded area of the hysteresis controller assigned to the phase output a. Similarly, dashed lines $W_b$ and $W_c$ divide corresponding tolerance widths $\delta I_b$, $\delta I_c$. If the end portion of the vector corresponding to the vectorial combination of the actual and desired current difference is outside of the hatched areas, as is shown for the vectorial difference vector $\Delta I_1$, then all three controllers respond. In this case, that discrete vector can be addressed by the known method as the new voltage vector so as to produce the fastest possible reduction of the control difference. However, if the control difference for one of the three controllers falls within the corresponding tolerance strip, as is shown for the vectorial difference vector $\Delta I_2$ to which is within the tolerance strip $W_c \pm \delta I_c$ which is assigned to phase output c in FIG. 3, then the output signal of this controller depends, as a result of the hysteresis characteristic, upon the prior history of the control difference. The known method, therefore, is not capable of unambiguously determining the particular voltage vector which is closest to the space vector $\Delta I_2$ in the opposite direction, and this therefore leads to the fastest reduction of the control difference among all vectors $Z_1$ to $Z_6$.

In accordance with the present inventive method, it can now be determined from this vectorial presentation of the control difference whether a tolerance limit is exceeded, and the voltage vector which leads most effectively to a reduction of the current control difference, or the absolute value of the control difference vector. In particular, the use of controllers or comparators with hysteresis characteristics is eliminated so that the determination of the voltage vector to be addressed no longer depends upon the prior history of the control.

In accordance with the invention, a trigger pulse is generated in a different manner than in the known system. A voltage vector which is to be addressed until a subsequent trigger pulse is predetermined when each trigger pulse occurs. This voltage vector is determined such that its direction is opposite to the control difference vector derived from the control differences between the actual and predetermined desired current values of the phase currents. Such a determination is performed where the control difference vector represents the vectorial difference between the current vector and the desired current vector resulting from the desired values of the phase currents. The expression "direction opposite to the control difference vector" is understood to mean that the respectively addressed voltage vector produces a reduction of the absolute value of the control difference vector. If the control difference is defined as $\Delta I = I - I^*$, this means that the control difference is positive for an actual current value which exceeds the desired current value, and the direction of the voltage vector is opposite to the so defined vectorial difference $I - I^*$. On the other hand, if the control difference were defined according to $I^* - I$, then the voltage vector to be addressed is to be determined in the direction of the so defined control difference vector. In any event, the control difference is conducted to the control of the voltage vector so that it leads as negative feedback to a reduction of the magnitude of the control difference.

Figure 4:
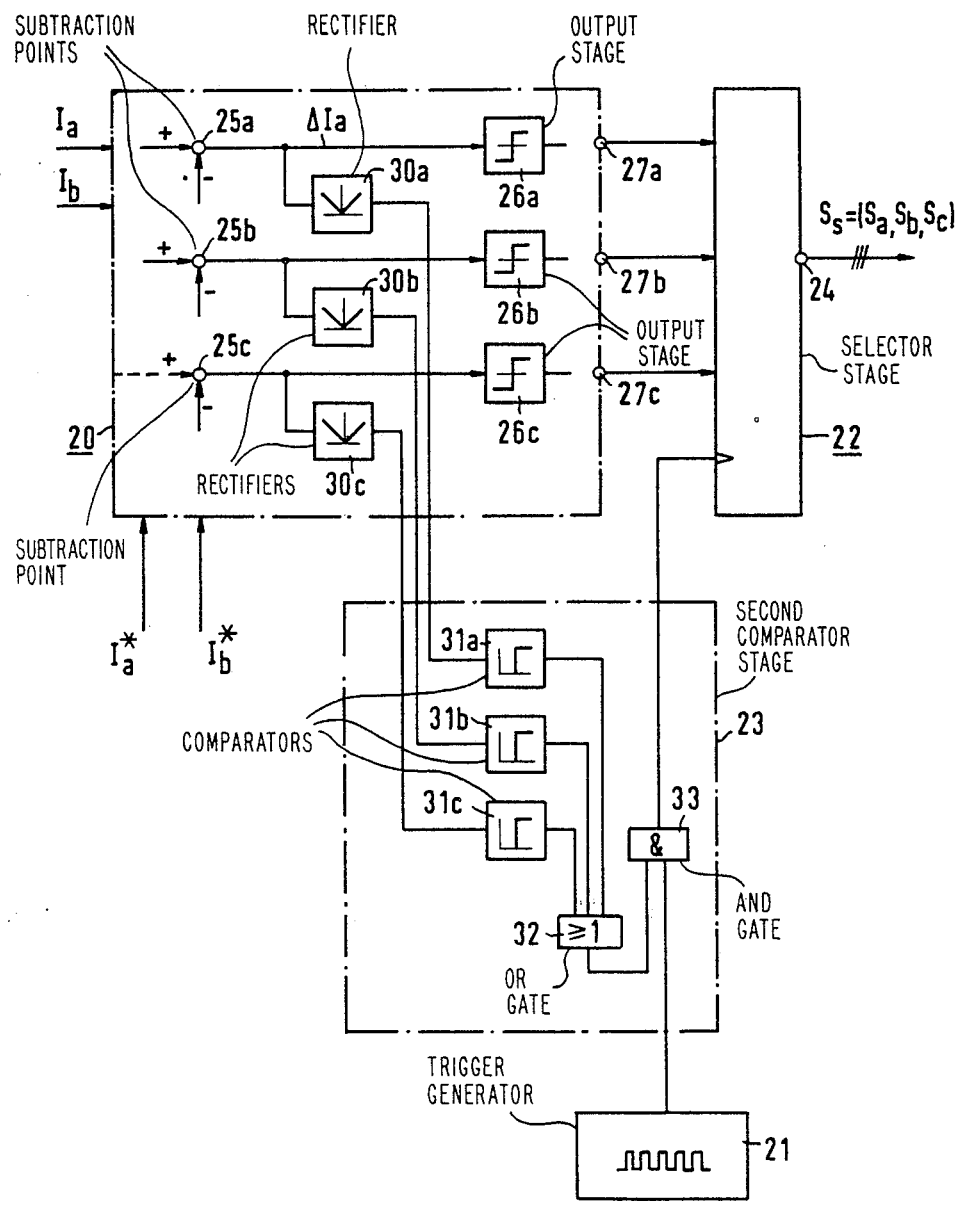
FIG. 4 is a block diagram of an embodiment of the invention utilizing an external trigger frequency source.

FIG. 4 is a block and line representation of apparatus for implementing the inventive method. Such apparatus consists essentially of a comparator stage, a trigger pulse generator, and a selector stage. In the figure, the internal circuit structure of comparator stage 20, trigger generator 21, selector stage 22, and second comparator stage 23, are shown only schematically for the case where trigger pulses are generated by an externally set frequency.

Comparator stage 20, by comparing the instantaneous actual values of the phase current with the instantaneous predetermined desired load current values, forms instantaneous control differences. Selector stage 22, which is coupled to comparator stage 20, is trigger by the pulses of generator 21 and provides at its outputs 24 the signals $S_a$, $S_b$, and $S_c$ which are assigned to converter outputs a, b, and c, in the particular combination which is required as the addressing signal $S_s$ for addressing a given voltage vector. For each trigger pulse, the voltage vector to be addressed until the subsequent trigger pulse occurs, $\Delta I_a$, $\Delta I_b$, and $\Delta I_c$, of the phase currents, are present as control difference signals. These control differences can be combined in selector stage 22 in the known manner to form a control difference vector which accurately represents the vectorial difference between the actual current vector and the desired current vector with respect to magnitude and direction. This vectorial difference is then utilized as a control input variable for a voltage control member which, together with the addressed converter switches, forms a voltage control element and sets the voltage vector at the converter outputs so that its direction is opposite to the vectorial difference of the currents.

Since the vectorial difference, and therefore the voltage vector to be addressed, do not generally coincide with respect to the magnitude and direction of one of the possible discrete states of the voltage vector, a voltage control method must be used in such a case which will permit the addressing of a voltage vector which is situated between two discrete vectors. Such a control method for the quasi-continuous addressing of a given voltage vector can, for example, consist of alternatingly singly or multiply addressing the two vectors which are adjacent to the voltage vector to be addressed. The "on" times for the two adjacent discrete vectors are determined from the set-in values of the voltage vector already to be addressed upon the occurrence of a trigger pulse in such a manner that in the time average, the desired voltage vector appears at the phase outputs. Such a control method is described in a copending German patent application entitled "Control Method and Control Apparatus for a Pulsed Inverter."

In the specific embodiment of FIG. 4 there is provided a limit indicator for each output stage 26a to 26c of first comparator stage 20. In practice, a value of zero is entered as the response limit. Thus, comparator stage 20 determines only the sign of the control difference. The variable sign $\Delta I_a$ is available at output 27a, and selector stage 22 can, in accordance with this signal, decide only whether the vectorial difference $\Delta I$ in FIG. 3 lies within the area above dash line $W_a$. A similar decision is made at outputs 27b and 27c by respective signs $\Delta I_b$ and $\Delta I_c$. This yes/no decision is made for the areas on either side of dashed lines $W_b$ and $W_c$, in FIG. 3, so as to determine from the input signals of the selector stage 22 the angular regions between the dashed lines wherein the vectorial difference falls. The angle bisector of the angular range which is associated in this manner with the vectorial difference ΔI always coincides with one of the discrete voltage vectors. If the addressing signal $S_s$ is used for addressing the voltage vector which corresponds to the discrete vector opposite to the angle bisector, it is assumed in any case that with this drive, the control difference decreases faster than with an addressing by another discrete vector. Moreover, since this determination of the vector to be addressed is performed for each trigger pulse, a control difference of the phase current, assuming a sufficiently high trigger pulse frequency is provided, is also quickly balanced out if only the discrete voltage vector determined in this manner is addressed until the next trigger pulse appears.

With this advantageous variance, only the signs of the control differences are determined for determining the addressing signal by which the switches of the converter are to be changed over. From the signs, only one discrete vector adjacent to the vectorial difference is determined. The voltage vector opposite to this adjacent vector is always addressed until the next trigger pulse. Contrary to the hysteresis control method described at the outset, comparators having a response limit of practically zero (i.e., without hysteresis behavior) are used here, so that the determination of the voltage vector to be addressed becomes independent of the prior history and leads to a rapid decrease of the control difference, and also for the control difference $\Delta I_2$, shown in FIG. 3.

For this invention, selector stage 22 can be of particularly simple design because the voltage vector at the input of the selector stage to be addressed is already fixed by the three sign signals $\Delta I_a$, $\Delta I_b$, and $\Delta I_c$. It is therefore sufficient to use as the selector stage a memory which reads-in, in the event of a trigger pulse, the instantaneous output signal $\Delta I_a$, $\Delta I_b$, and $\Delta I_c$, and delivers this signal at its outputs as the addressing signal $S_s=(S_a,S_b,S_c)$ for the converter switches working into the respective phase output until the next trigger pulse. Such a memory can therefore consist, for example, of a D-flip-flop for each phase output. In such an embodiment, the enable input of these D-flip-flops is connected to the trigger pulse generator 21.

The use of the hysteresis-free comparators 26 makes it necessary that the converter switches are always reversed, if the sign of the control difference is reversed for at least one phase current, and even if all control differences remain within predetermined tolerance widths. On the other hand, the trigger pulse frequency must not be selected too low, since a correction of the control deviation occurs only when a trigger pulse occurs. The switching stress on the converter can thereby become substantially greater as compared with the known method described at the outset.

Such stress can be avoided in the first-described variant of the invention wherein the vectorial difference ΔI itself is used as the control difference vector, as well as in the variant which uses the signs of the control difference, by determining the absolute values of the control differences in addition to the signs, and addressing for each trigger pulse which is generated in an externally set-in rhythm, another voltage vector only if the absolute value of the control difference exceeds, at least at one phase output, a predetermined tolerance limit. This purpose is served in FIG. 4 by the second comparator stage 23 which compares for each phase output the actual current value with the desired current value and always suppresses the switching of the control signals if none of the differences exceeds the predetermined tolerance limit. The control differences which are determined at subtraction points 25 are rectified in rectifiers 30a, 30b, and 30c, and are conducted to comparators 31a, 31b, and 31c, wherein respective tolerance limits $\delta I_a = \delta I_b = \Delta I_c$ have been set. The outputs of the comparator are combined in an OR gate 32 and taken, together with the trigger pulse of the trigger pulse generator 21, to an AND gate 33. This AND gate delivers a trigger pulse for comparator stage 22 only if a tolerance limit of the phase current is exceeded in the interrogation cycle given by the trigger frequency.

Figure 5:
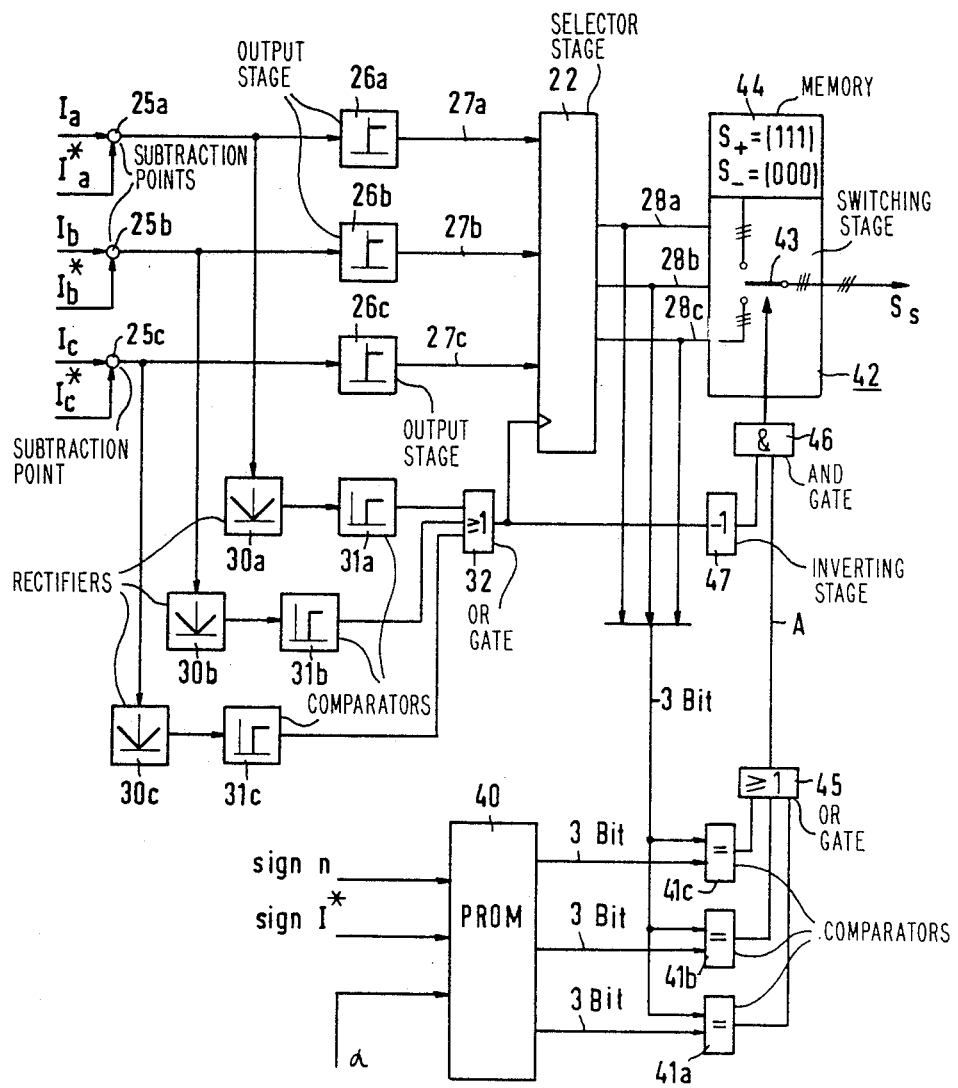
FIG. 5 is a block diagram of an embodiment of the invention which does not require a predetermined trigger frequency.

Switching stress is also reduced if, while the determination of the addressing signal $S_s$ is produced, the trigger pulse itself is not generated in an externally predetermined rhythm, contrary to FIG. 4. In such a system, which may include the two above discussed variants of the invention, the trigger pulse may be merely suppressed by the second comparator stage 23 which serves as the internal trigger pulse generator. FIG. 5 illustrates a preferred embodiment of this method variance.

Selector stage 22 in FIG. 5 corresponds in design to first comparator stage 20 in FIG. 4. In this embodiment, the absolute values of the control differences may be determined in addition to the signs. However, a trigger pulse is always generated if the absolute value of a control difference exceeds a predetermined tolerance limit.

If a comparator stage such as second comparator stage 23 in FIG. 4, is used in FIG. 5 as the trigger pulse generator, it must contain limit value indicators which are arranged to deliver a trigger pulse if the difference between the actual and desired load current values exceeds a predetermined tolerance limit. In FIG. 5, comparators 31a, 31b, and 31c contain within them a tolerance limit, and are followed by a pulse stage (not shown) which delivers a pulse via OR gate 32 to the ready input of a flip-flop circuit which serves as selector stage 22, when one of the comparators responds.

Since the signals which are conducted to comparator stage 22 always assign one of the discrete vectors $Z_1$ to $Z_6$ to the vectorial difference ΔI, the zero state, $Z_0$ is never addressed in the embodiments described so far. Such operation is contrary to the known method described hereinabove wherein the load is connected to one of the DC voltage inputs of the frequency converter such that all of the phase outputs are in the same state and wherein the load current must adjust itself only in accordance with the state of the load. However, lower losses are achieved in the control of the frequency converter and the switching stress is reduced if this same state condition is included in the control.

The foregoing can be accomplished by determining from the operating data of the load the voltage space vectors which characterize the instantaneous internal voltage of the load, comparing this instantaneous internal voltage with the predetermined voltage vector to be addressed, and forming an addressing signal such that all phase outputs are in the same state condition and alternatingly connected to one of the DC voltage input terminals. Such addressing is performed if the direction of the two vectors coincide and would be in place of an addressing signal for the voltage vector which is determined in advance. It is an advantage that the same state condition is addressed only if no control difference exceeds a predetermined tolerance limit. It is preferable that the connection of all of the phase outputs into the same state condition be effected alternatingly between the DC voltage input terminals.

It is a further advantage of the invention that the spatial position of the internal voltage can be determined by operation of an angle generator from the operating data relating to the load. In the specific illustrative embodiment of FIG. 5, a programmable read-only memory (PROM) serves as the angle generator 40 wherein data is stored. Such data may include, for example, the magnet wheel angle $\alpha$ in embodiments where a synchronous machine is controlled. In addition, such stored data may include information for determining the direction of rotation and the mode of operation (motor/generator), the signs sign n, sign I* of the speed of rotation, and the stator current.

The angle generator determines an angular range, within predetermined limits, which encloses the spatial position of the internal voltage. A third comparator stage having comparators 41a to 41c determines whether the output signal of the first comparator stage which corresponds to a discrete angle position of the desired voltage vector and optionally with the interposition of flip-flop circuit 22 having outputs 28a, 28b, and 28c, agrees with one of the output signals of the angle generator. If one of the comparator responds, there is generated at the output of the following logic state (45) a signal A, whereby the addressing signals which are formed in the first comparator stage are switched in a switching stage 42 to address the same state condition.

The outputs of comparators 41 are combined at an OR gate 45 such that a signal A is delivered to switching stage 42 for switching to the same state condition only if one of the comparators indicates agreement. The switching stage contains a three-phase double-throw switch 43 which switches the three-bit addressing signal, $S_s = (S_a, S_b, S_c)$, from the signals provided by the signs of the control differences and made available at the outputs of the flip-flops 22, to the input of a memory 44 from which is alternatingly readout, $S_a = S_b = S_c = 1$, corresponding to $S_+$ for positive same state condition, or $S_a = S_b = S_c = 0$ which corresponds to $S_-$ for the negative same state condition. In this manner, it is ensured that the switching to the same state condition can always be accomplished if the instantaneous operating state of the load is itself already suitable for counteracting the control difference in the correct direction.

Situations may occur where the EMF of the machine is insufficient to cause sufficient current to flow, particularly in the event of dynamic changes of the desired value. This situation occurs in particular when a control difference is too large, illustratively if the control difference exceeds the predetermined tolerance limit. In such cases, it is advantageous to connect a gate to the third comparator stage, which gate is addressed by the output of the second comparator stage and suppresses the switching of the addressing signals to the same state condition, if the difference between the actual and desired current values exceeds the predetermined tolerance limit. In FIG. 5, AND gate 46 can be used for this purpose. AND gate 46 receives the combined signals of comparators 41 via OR gate 45, and the signal from OR gate 32 via inverting stage 47.

In this manner, the same state condition is addressed only if the load current remains within the tolerance limits in response to the internal voltage of the load, and without the necessity of impressing a voltage through the frequency converter. At all other times, the voltage state which makes the largest contribution to the current change rate in the direction of the actual control deviation is addressed, if a trigger pulse occurs. This occurs independently of the operating state of the motor.

Although the invention has been described in terms of specific embodiments and applications, persons skilled in the art can generate additional embodiments without departing from the spirit or exceeding the scope of the claimed invention. Accordingly, it is to be understood that the drawings and descriptions herein are proffered to facilitate comprehension of the invention and should not be construed to limit the scope thereof.

What is claimed is:

1. A method for forming addressing signals for addressing respective converter switches of a frequency converter wherein a DC voltage is provided across DC input terminals of the frequency converter for producing a current and a voltage at a load which is connected to phase outputs of the frequency converter, the method having the steps of determining space vectors for the load current and load voltage, determining a plurality of discrete space vectors which are determined by the states of the converter switches, representing the load voltage vector as a time average of selected ones of the discrete space vectors which are each addressable by respective addressing signals, preselecting desired load current values, determining control differences between actual load current values and the preselected desired load current values, and switching among the discrete space vectors in response to the determined control differences, the method comprising the further steps of:
   generating a trigger pulse; and
   determining the addressing signals which correspond to a voltage vector which is to be addressed until a subsequent trigger pulse is generated such that the load voltage vector to be addressed is arranged in opposition to a control difference vector which is determined in response to the control differences, said control difference vector corresponding to a vectorial difference between the load current space vector and a desired current vector which corresponds to the preselected desired load current values.

2. The method of claim 1 wherein there are provided the further steps of:
   determining the polarity signs of the control differences;
   selecting at least one of the discrete space vectors which is adjacent to said control difference vector in response to said polarity signs; and
   addressing one of the discrete space vectors which is arranged opposite to said selected discrete space vector, until said subsequent trigger pulse is generated.

3. The method of claim 1 or 2 wherein there are provided the further steps of:
   determining an absolute value of said control differences;
   producing said trigger pulses in response to an externally predetermined rhythm; and
   addressing a further load voltage space vector only if said absolute value exceeds a predetermined tolerance limit at at least one of the phase outputs.

4. The method of claim 1 or 2 wherein there are provided the further steps of:
   determining an absolute value of said control differences; and
   producing a further trigger pulse if said absolute value of said control differences exceeds a predetermined tolerance limit.

5. The method of claim 2 wherein there are provided the further steps of:
   determining the load voltage space vector in response to operating data pertaining to the load;
   comparing said load voltage space vector with a load voltage space vector which is to be addressed; and
   forming same state addressing signals for connecting all of the phase outputs to a selected one of said DC input teminals of the frequency converter such that all of the phase outputs are in the same state.

6. The method of claim 5 wherein said same state addressing signals are formed only if all control signal differences are within said predetermined tolerance limit.

7. The method of claim 5 wherein said same state addressing signals are formed so as to place all of the phase outputs into the same state and connect all of the phase outputs alternately to the DC input terminals of the frequency converter.

8. An apparatus for forming addressing signals for addressing respective converter switches of a frequency converter, the apparatus being of the type wherein the frequency converter is provided with DC input terminals for receiving electrical energy which is conducted to phase output terminals in response to the operation of the converter switches, the apparatus further comprising:
   a first comparator stage for forming instantaneous control differences from a comparison of instantaneous actual values with predetermined desired values for phase currents;
   a trigger pulse generator; and
   a selector stage for producing for each trigger pulse from said instantaneous control differences the addressing signals which correspond to a voltage space vector which is to be addressed until a subsequent trigger pulse is produced and which is opposite to a control difference vector formed from said control differences.

9. The apparatus of claim 8, wherein there is further provided a selector stage which contains for each of said control differences a limit value indicator (26a, 26b, 26c) having a response limit of practically zero; and
   memory means for storing for a trigger pulse an instantaneous output signal for each of said limit value indicators and supplying said instantaneous output signal until the occurrence of a subsequent trigger pulse which serves as the addressing signal for the converter switch associated with the corresponding phase output.

10. The apparatus of claim 8 wherein there is further provided:
    external means for governing a frequency of said trigger pulse generator; and
    second comparator stage for comparing said actual current values with said predetermined desired current values which suppress switching-over of the addressing signals if a control difference is within a predetermined tolerance limit.

11. The apparatus according to claim 8 or 9, wherein said trigger pulse generator contains a second comparator stage having respective limit value indicators which deliver a trigger pulse if the control difference exceeds a predetermined tolerance limit.

12. The apparatus of claim 8 wherein there is further provided:
    an angle generator for determining from operating data pertaining to the load, a space vector for the spatial position of the internal voltage of the load;
    a third comparator stage having comparators therein which are addressed by said first comparator stage or said selector stage, and said angle generator;
    a logic member for following the comparators and delivering a control signal in the event of equality of signals formed by said angle generator and said selector stage; and
    a switching-over stage for switching with said control signal from the addressing signals formed by the selector stage to a same state addressing signal wherein all phase outputs are connected to one of the DC voltage inputs of the frequency converter such that all of the phase outputs are in the same state.

13. The apparatus of claim 12, wherein there is further provided a gate circuit following said third comparator stage, said gate circuit being addressed by the output of said second comparator stage suppressing switching-over of the addressing signal to said same state addressing signal if a control difference exceeds said predetermined tolerance limit.

* * * * *